D. BEST.
Improvement in Apparatus for Coating Seed Wheat with Sulphate of Copper.

No. 133,139. Patented Nov. 19, 1872.

Witnesses
J. L. Borne
C. M. Richardson

Daniel Best
per Dewey & Co.
Att'ys

UNITED STATES PATENT OFFICE.

DANIEL BEST, OF MARYSVILLE, CALIFORNIA.

IMPROVEMENT IN APPARATUS FOR COATING SEED-WHEAT WITH SULPHATE OF COPPER.

Specification forming part of Letters Patent No. 133,139, dated November 19, 1872.

*To all whom it may concern:*

Be it known that I, DANIEL BEST, of Marysville, Yuba county, State of California, have invented a Machine for Applying a Solution of Sulphate of Copper to Seed-Wheat; and I do hereby declare the following description and accompanying drawing are sufficient to enable any person skilled in the art or science to which it most nearly appertains to make and use my said invention without further invention or experiment.

My invention relates to a novel apparatus for mixing seed-wheat with blue-stone or sulphate-of-copper solution in order to destroy the parasitic fungus or smut which may be attached to it, and also to prevent the birds from carrying it off when sown.

In order to explain my invention as required by law, reference is had to the accompanying drawing forming a part of this specification, in which—

Figure 1:
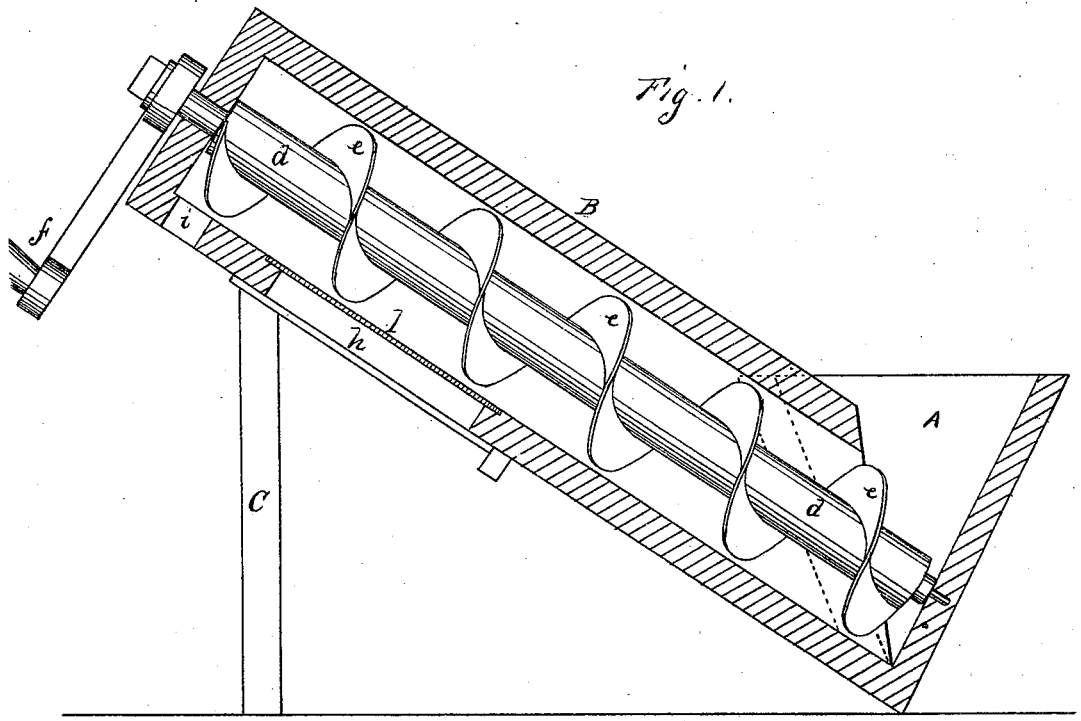
Figure 2:
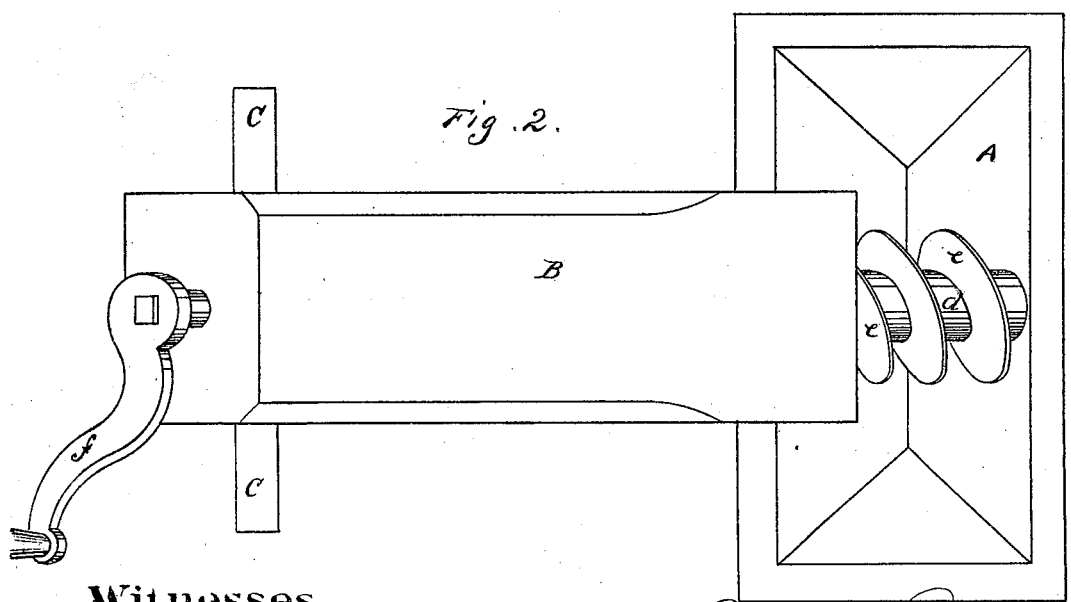

Figure 1 is a longitudinal section of my machine, and Fig. 2 is a top or plan view.

A represents a trough or hopper, which, in the present instance, is shown to be in the form of a V. This form I prefer, as being better adapted to the mixing and elevating apparatus than any other; but it can be made in any other convenient form. B is a spout, which is connected with one side of the hopper A and stands at a proper angle, its outer or elevated extremity being supported by legs C C. The upper end of this spout is closed, and a shaft, *d*, passes longitudinally through it, bearing at its lower end in the side of the box A opposite the spout, and at its upper end in the upper closed end of the spout. A wide flange, *e*, is secured spirally around this shaft in the manner of constructing an ordinary spiral conveyer, and extends down into the box or hopper A. A crank, *f*, at the upper end, serves to revolve it. Midway between the middle and upper end of the spout a slot, *h*, is made in its bottom, extending longitudinally with the spout, and at its upper lower corner, above the slot *h*, a transverse slot, *i*, is made. The slot *h* is covered on the inside of the spout with a perforated screen, *l*.

To use this mixture the blue-stone or sulphate-of-copper solution is placed in the hopper A and the wheat emptied into it; the shaft *d* is then revolved by means of the crank so as to cause the spiral flange which projects into the hopper A to stir up the wheat and convey it up the spout. During its progress up the spout the wheat partly draws off the solution, and in passing over the screen *l* the water passes off through the slot *h*, and may be carried back into the hopper A by a spout, if desired. The wheat is discharged through the upper slot *i* into any convenient receptacle.

Having thus described my invention, what I claim, and desire to secure by Letters Patent, is—

The hopper A and inclined spout B, connected as described, said spout having the slot *h* covered with the screen *l* for the purpose specified, and the discharging-slot *i*, in combination with the screw-conveyer for stirring, lifting, and draining the wheat, substantially as and for the purpose described.

In witness whereof I hereunto set my hand and seal.

DANIEL BEST. [L. S.]

Witnesses:
  J. R. LAURENCE,
  D. DUFFICY.